(12) United States Patent
Li et al.

(10) Patent No.: US 9,632,729 B2
(45) Date of Patent: Apr. 25, 2017

(54) STORAGE COMPUTE DEVICE WITH TIERED MEMORY PROCESSING

(71) Applicant: Seagate Technology LLC, Cupertino, CA (US)

(72) Inventors: Peng Li, Lauderdale, MN (US); Richard Esten Bohn, Shakopee, MN (US); David Tetzlaff, Minnetonka, MN (US); Kevin Arthur Gomez, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/704,111

(22) Filed: May 5, 2015

(65) Prior Publication Data

US 2015/0324125 A1    Nov. 12, 2015

Related U.S. Application Data

(60) Provisional application No. 61/989,867, filed on May 7, 2014.

(51) Int. Cl.
*G06F 12/00* (2006.01)
*G06F 3/06* (2006.01)

(52) U.S. Cl.
CPC ............ *G06F 3/0685* (2013.01); *G06F 3/061* (2013.01); *G06F 3/0631* (2013.01); *G06F 3/0656* (2013.01); *G06F 3/0679* (2013.01); *G06F 2206/1014* (2013.01)

(58) Field of Classification Search
CPC ...... G06F 3/0685; G06F 3/061; G06F 3/0631; G06F 3/0656; G06F 3/0679; G06F 2206/1014
See application file for complete search history.

(56) References Cited

U.S. PATENT DOCUMENTS

| | | | |
|---|---|---|---|
| 5,099,447 A | 3/1992 | Myszewski | |
| 8,463,825 B1 | 6/2013 | Harty et al. | |
| 8,578,096 B2 | 11/2013 | Malige et al. | |
| 2004/0015479 A1* | 1/2004 | Meek | G06F 17/30289 |
| 2007/0112890 A1* | 5/2007 | Murase | G06F 17/30011 |
| 2010/0082547 A1* | 4/2010 | Mace | G06F 11/1435 707/648 |
| 2012/0331249 A1 | 12/2012 | Benjamin et al. | |

* cited by examiner

*Primary Examiner* — Larry Mackall
(74) *Attorney, Agent, or Firm* — Hollingsworth Davis, LLC (57) ABSTRACT

A data object is received at a storage compute device in response to a request from a host. A requirement of the data object is determined based on a computation to be performed on the data object. The requirement related to at least speed and capacity of media used to store the data object. A tier is selected from the storage compute device based on speed and capacity characteristics of the selected tier corresponding to the requirement of the data object. The data object is stored in the selected tier.

20 Claims, 5 Drawing Sheets

STORAGE COMPUTE DEVICE WITH TIERED MEMORY PROCESSING

CROSS REFERENCE TO RELATED APPLICATIONS

This application claims priority and benefit to U.S. Provisional Patent Application No. 61/989,867, entitled "STORAGE COMPUTE DEVICE WITH TIERED MEMORY PROCESSING", filed on May 7, 2014. The content of that application is incorporated herein in its entirety by reference.

SUMMARY

The present disclosure is related to a storage compute device. Methods, apparatuses and computer-readable medium facilitation receiving a data object at a storage compute device in response to a request from a host. A requirement of the data object is determined based on a computation to be performed on the data object at the storage compute device. The requirement is related to at least speed and capacity of media used to store the data object. A tier is selected from a plurality of tiers of the storage compute device based on speed and capacity characteristics of the selected tier corresponding to the requirement of the data object. The data object is stored in the selected tier.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same components in multiple figures. The drawings are not necessarily to scale.

DETAILED DESCRIPTION

This disclosure generally relates to use of a data storage device that performs internal computations on data on behalf of a host, and is referred to herein as a storage compute device. While a data storage device, such as a hard drive, solid-state drive (SSD), hybrid drive, etc., generally include data processing capabilities, such processing is related to the storage and retrieval of user data. So while the data storage device may perform some computations on the data, such as compression, error correction, etc., these computations are invisible to the host. Similarly, other computations, such as logical-to-physical address mapping, involve tracking host requests, but are intended to hide these tracking operations from the host.

Some computational tasks are well suited to be performed using massively distributed computing resources. For example, data centers that provide web services, email, data storage, Internet search, etc., often distribute tasks among hundreds or thousands of computing nodes. The nodes are interchangeable and tasks may be performed in parallel by multiple computing nodes. This parallelism increases processing and communication speed, as well as increasing reliability through redundancy. Generally, the nodes are rack mounted computers that are designed to be compact and power efficient, but otherwise operate similarly to desktop computer or server.

For certain types of tasks, it may be desirable to rearrange how data is processed within the individual nodes. For example, applications such as neuromorphic computing, scientific simulations, etc., may utilize large matrices that are processed in parallel by multiple computing nodes. Matrix data may be stored in random access memory and/or non-volatile memory, where it is retrieved, operated on by relatively fast central processor unit (CPU) cores, and the results sent back to volatile and/or non-volatile memory. It has been shown that the bus lines and I/O protocols between the CPU cores and the memory can be a bottleneck for this type of computation.

While a storage compute device as described herein may be able to perform as a conventional storage device, e.g., handling host data storage and retrieval requests, such devices may include additional computational capability that can be used for certain applications. For example, scientific and engineer simulations may involve solving matrix equations on very large matrices. Even though the matrices may be sparse, and therefore amenable to a more concise/compressed format for storage, the matrices may be still be so large as to prevent solution using random access memory (RAM) of a single computing node.

One solution to solving these large matrix problems is to distribute the solution among a number of nodes coupled by a network. Each node will solve part of the problem, and various internode messages are passed to coordinate operations and shared data between the nodes. While this can alleviate the need for large amounts of RAM on each node, it has been found that in some cases this does not effectively use processing resources. For example, the central processing units (CPUs) may spend significant amounts of time waiting for network input/output (I/O) and be underutilized as a result.

It generally accepted that compute performance can be improved by keeping the data "close to" the processors that operate on the data. This closeness refers both to physical proximity and reduction in the number of different communications channels and protocol layers that lie between the data in memory and the processor. While CPU and RAM might qualify as close to one another (particularly when using hierarchical memory caches), the size of system RAM may be limited for some problems. In such a case, the system bottlenecks occur in from slower channels (e.g., disk drives, network interfaces) moving data in and out of RAM as needed.

For problems and applications that work on very large sets of data, a local non-volatile memory may be needed to store the data sets, as well as intermediate results of calculations. While the speed of currently available non-volatile RAM (NVRAM) is appreciably slower than currently available dynamic RAM (DRAM), for problems with large data sets, an increase in performance may be seen by performing the computations on the storage device itself. While the processor and memory resident on typical storage devices may be slower than CPU and RAM of typical computers, the amount of NVRAM available can be orders of magnitude greater than RAM for similar cost. Further, the storage device can move large amounts of between its non-volatile memory and its local processor more quickly that it could move the same data to a CPU. Internal data processing does not have to deal with contention, translation, protocols, etc., that is involve in moving data between the host interface of the storage device and the CPU cores.

Figure 1:
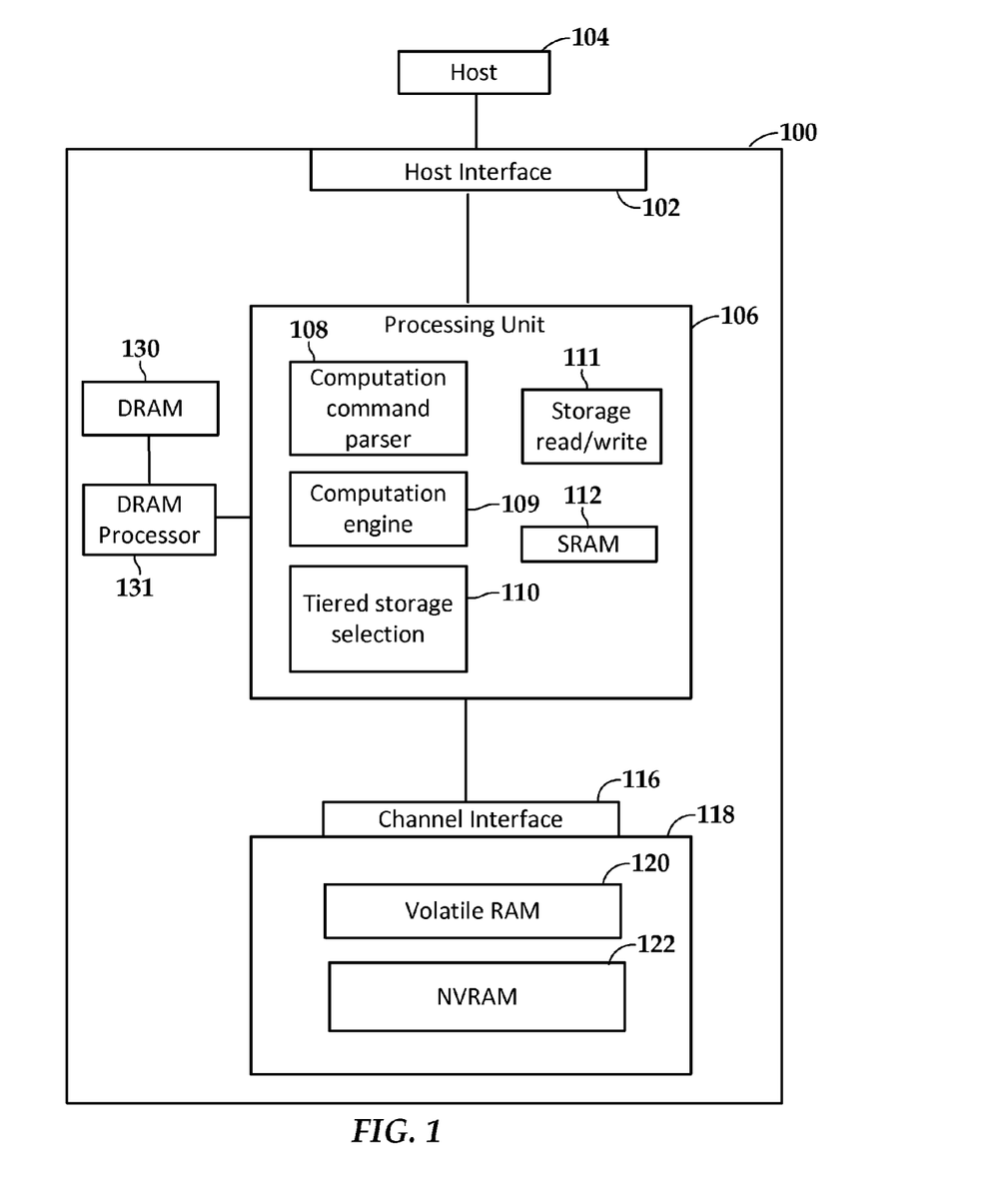
FIG. 1 is a block diagram of a storage compute device according to an example embodiment.

In FIG. 1, a block diagram shows a storage compute device 100 according to an example embodiment. The storage compute device 100 may provide capabilities usually associated with data storage devices, e.g., storing and retrieving blocks of data, and may include additional computation abilities as noted above. Generally, the storage compute device 100 includes a host interface 102 configured to communicate with a host 104. The host interface 102 may use electrical specifications and protocols associated with existing hard drive host interfaces, such as SATA, SaS, SCSI, PCI, Fibre Channel, etc.

The storage compute device 100 includes a processing unit 106. The processing unit 106 includes hardware such as general-purpose and/or special-purpose logic circuitry configured to perform functions of the storage compute device 100, including functions indicated in functional blocks 108-112. Functional block 111 provides legacy storage functionality, such as read, write, and verify operations on stored data. Blocks 108-110, and 112 represent specialized functionalities that allow the storage compute device 100 to provide internal computations on behalf of the host 104.

Block 108 represents a command parser that manages object-specific and computation-specific communications between the host 104 and storage compute device 100. For example, the block 108 may process commands that define objects (matrices, vectors, scalars, sparse distributed representations) and operations (e.g., scalar/matrix mathematical and logical operations) to be performed on the objects. A computation engine 109 performs the operations on the objects, and may be specially configured for a particular class of operation. For example, if the storage compute device 100 is configured to perform a set of matrix operations, then the computation engine 109 may be optimized for that set of operations. The optimization may include knowledge of how best to store and retrieve objects for the particular storage architecture used by the storage compute device 100.

In this embodiment, a tiered storage selection block 110 facilitates classification of objects and operations for storage into different tiers of non-volatile memory. The command parser 108 can receive sparse or dense matrices as objects from the host 104 via the host interface 102, and the tiered storage selection block 110 ensures the storage format is the most efficient based on, among other things, particulars of the tiered storage device architecture and operations targeted for the matrices. For example, each of the tiers of memory may include volatile memory or non-volatile storage media corresponding to one of a set of requirements/characteristics related to the speed and the capacity of the media within each tier. The system may select a particular tier based on balance of speed and capacity of the storage media to provide an overall increase in performance.

The functional blocks 108-112 may access persistent storage, by way of a channel interface 116 that provides access to memory 118. There may be multiple channels, and in such a case there may be a dedicated channel interface 116 and computation engine 109 for each channel. The memory 118 may include both volatile memory 120 (e.g., DRAM and SRAM) and non-volatile memory (e.g., flash memory, magnetic media) 122. The volatile memory 120 may be used as a cache for read/write operations performed by read/write block 111, such that a caching algorithm ensures data temporarily stored in volatile memory 120 eventually gets stored in the non-volatile memory 122. The computation blocks 108-110, and 112 may also have the ability to allocate and use volatile memory for calculations. Intermediate results of calculations may remain in volatile memory 120 until complete and/or be stored in non-volatile memory 122.

As noted above, the SRAM 112 and the DRAM 130 can form two or more tiers of volatile memory, and at least the non-volatile memory 122 has two or more tiers, and the functional blocks 108-112 may be configured to specify a particular tier for storage of at least part of an object. An example of a tiered memory architecture according to an example embodiment is shown in the block diagram of FIG. 2. Tiered volatile and non-volatile memory 200 includes different tiers of memory, as represented by different media types 202-207. Media types 112 and 130 are volatile memories (SRAM and DRAM). Media types 202-204 are all non-volatile, solid-state memory (e.g., NAND flash) whereas media type 205 is a magnetic disk. The solid-state memory includes single-level cell (SLC) media 202, multi-level cell (MLC) media 203, and triple-level cell (TLC) media 204.

Figure 2:
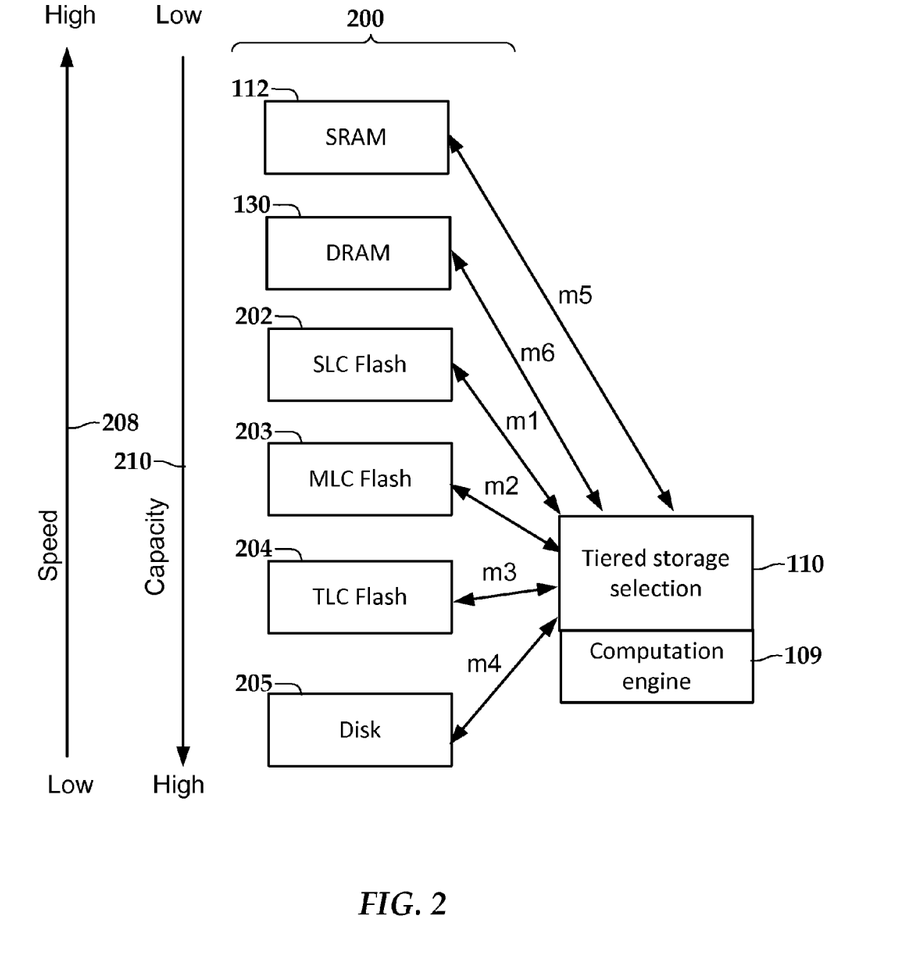
FIG. 2 is a block diagram showing a tiered memory architecture according to an example embodiment.

As indicated by the arrow 208, the media types 112, 130, 202-205 are ordered by speed, with the "fastest" at the top, and the "slowest" at the bottom. The term "fastest" and "slowest" may be dependent on context, e.g., whether read or write is being measured, whether the data is written randomly or sequentially, write amplification, etc. Further, speed may have different measures, including throughput, latency, etc. Nonetheless, flash memory may be considered generally faster than magnetic disks for most purposes, and the fewer levels per cell of flash memory generally allows for faster throughput.

As indicated by arrow 210, the media types 112, 130, 202-205 are also ordered by capacity, with the "lowest" capacity at the top, and the "highest" capacity at the bottom. Generally, the capacity of a given media type depends on how the system is implemented, however, the indicated ordering represents a general indication of cost per unit of storage. It is generally understood that magnetic disk media 205 cheapest per unit of storage and SRAM 206 is the most expensive.

It will be understood that the example tiered volatile/non-volatile memory 200 may use additional characteristics to define tiers. For example, long-term reliability, energy consumption, error correction, etc., may be additional characteristics that are considered when choosing where to store an object. Generally, the tiered storage selection block 110 may work together with computation engine 109 to select a tier for storing a particular object.

For example, the computation engine 109 may work with a large matrix (e.g., millions or billions of elements) and perform computations on the matrix. If the matrix is sparse (e.g., mostly zeroes) it may be stored/represented in a particular format that reduces storage space. Based on these and other factors, the computation engine 109 may define a set of requirements for the object, e.g., based on amount of memory needed to store the object (e.g., capacity) and impacts that loading and storing parts of the object may have on computation time (e.g., speed). The particular representation of the object (e.g., compressed sparse matrix form) and computation to be performed on the object (e.g., multiplication, inversion) may further impact these requirements.

The set of requirements can be provided to the tiered storage selection block 110, which makes a decision as to which media 112, 130, 202-205 is best suited for storing the object. The actual storage of the object to non-volatile memory 200 may be performed by the tiered storage selection block 100, such that the computation engine 109 need not know the details of the storage in order to utilize the object.

While a hierarchical memory arrangement tends to favor accessing the fastest type of memory (e.g., a cache) the tiered arrangement may store objects directly to a particular tier. Very large data objects may be directly stored to and loaded from a relatively slower tier of memory if the entire object can be stored and/or retrieved using a sequential read operation. This can prevent excessive swapping in and out of a cache that might occur if hierarchical memory were used, and if the object was significantly larger than the cache.

Figure 3:
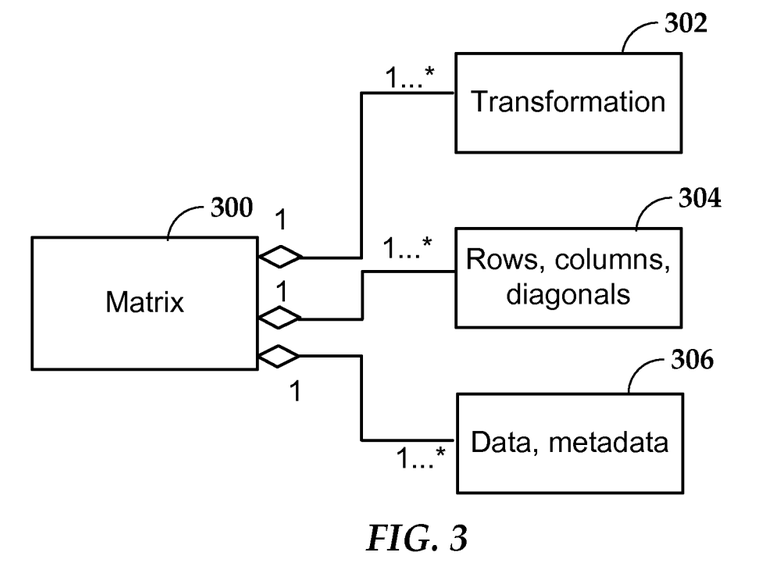
FIGS. 3-4 are block diagrams illustrating illustrates objects and sub-objects according to example embodiments.

An object may be separated into sub-objects that are stored in different tiers of the memory. In FIG. 3, a block diagram illustrates objects and sub-objects that may be associated with matrices according to an example embodiment. A matrix 300 may include transformed object sub-parts 302 that are used, for example, as intermediate results. A matrix 300 may also be considered an aggregation of individual matrix parts, shown here with rows, columns, and diagonal sub-parts 304. This type of sub-part 304 may also include sub-matrices, vectors, etc. The matrix 300 may also be considered as an aggregate of data and metadata sub-parts 306.

As an example of sub-parts 302, consider matrix A that is used in a number of calculations, e.g., $A^{-1}B$, $A^{-1}C$, etc. The inverse of A, $A^{-1}$, may be considered a sub-object of A, e.g., a transformation of A. This inverse matrix may be considered an intermediate result, as well as results of the matrix multiplications noted above. The matrix A may itself be part of an intermediate result, e.g., where the matrix is updated in response to an iterative calculation. Because the inverse of the matrix is used for more calculations than the original matrix in this example, the inverse may be stored in a tier of memory that facilitates faster retrieval. The original matrix is accessed less often than the inverse, and so there may be less of a penalty for storing the original matrix in a slower tier of memory than the inverse of the matrix. Other intermediate results may be stored in slower or faster tiers depending on the particular problem.

The use of different tiers may apply to other matrix transformations, e.g., transpose, multiplication by a scalar, etc. For example, the transpose of a sparse matrix may be more efficiently stored in a different compressed format than the original matrix. Or, a less space-efficient format may be used if it speeds other aspects of computation. Similarly, making a copy of a matrix with all elements scaled by a constant may in some cases (e.g., where the scaled matrix is accessed multiple times) be more dynamically performing the scaling as needed. Generally, a slower, larger-capacity tier can be used for storing the transformed matrix if it results in improved performance in the long term.

Sub-parts 304 include portions and/or partitions of a matrix that may be separated out for particular operations. Consider multiplication of matrices, which involves multiplying elements of the rows of one of the matrices with elements of the columns of the other. The matrices may be of such a size that precludes storing both matrices in a faster tier of memory. In such a case, a first one of the matrices can be selected for storage in the faster tier of memory, e.g., the first matrix being smaller, sparser, etc. than the other. The other, second matrix is stored in a slower tier. A sub-object of the second matrix, e.g., a single row or column of the second matrix, can be moved into the faster tier, where it is multiplied with the appropriate elements of the other matrix. This is repeated for subsequent rows/columns of the second matrix. While there is some overhead associated with moving the row/columns between tiers, this is offset by the faster multiplication of the moved rows/columns with the first matrix within the faster tier, which might be repeated thousands of times.

Sub-objects 306 include data and metadata associated with the matrix. For example, a sparse matrix may be stored in a compressed format, which includes non-zero matrix data and metadata. One of these formats, presented for purposes of illustration, is used for sparse matrix having a large number of diagonals containing all zeros, referred to as the DIA format. The DIA format stores two arrays: values and distance. The "values" matrix is lval by ndiag in size, where lval is the number of rows of the sparse matrix, and ndiag is the number of non-empty diagonals. The distance is an integer array with dimension ndiag. Element I of the array distance is the distance between i-diagonal and the main diagonal. For example, the matrix B can be represented in a "values" matrix and a "distance" array/vector as show below.

$$B = \begin{bmatrix} 6 & 0 & 0 & -4 & 0 \\ 3 & 7 & 0 & 0 & 0 \\ 0 & 0 & 2 & 0 & 0 \\ -4 & 0 & 1 & 7 & 0 \\ 0 & 5 & 0 & 0 & -1 \end{bmatrix}$$

$$\text{values} = \begin{bmatrix} * & * & 6 & * \\ * & 3 & 7 & * \\ * & 0 & 3 & * \\ -4 & 1 & 7 & -4 \\ 5 & 0 & -1 & 0 \end{bmatrix}$$

$$\text{distance} = \begin{bmatrix} -3 & -1 & 0 & 3 \end{bmatrix}$$

It can be seen that "values" is a 5 by 4 matrix, because the sparse matrix B has 5 rows and 4 non-empty diagonals. The asterisks denote padded elements, they can be any values such as 0. The first column of the matrix values stores the first non-empty diagonal in the sparse matrix B (from bottom-left to up-right). The second column of the matrix values stores the second non-empty diagonal in the sparse matrix B.

The array "distance" has the 4 entries, because the sparse matrix B has 4 non-empty diagonals. The first entry of distance is −3 because the diagonal stored in the first column of the matrix values has a distance −3 to the main diagonal of the sparse matrix B. The second entry of distance is −1 because the diagonal stored in the second column of the matrix values has a distance −1 to the main diagonal of the sparse matrix B.

In this example, the "values" matrix is much larger than the "distance" array. However, when manipulating the matrix (e.g., performing calculations using the matrix and/or transforming the matrix) the "values" matrix itself may be too large to be stored in DRAM, and so must be loaded and stored directly from and to non-volatile memory when performing these operations. However, the "distance" array can be stored in DRAM. As such, in this example it may benefit performance by storing the "distance" array, which may be considered metadata, in a slower tier of memory. It can be loaded into DRAM once, and may remain there as long as needed. This conserves space in the faster tier of memory and may ultimately result in faster performance.

A storage compute device may be used for processing data other than matrices. For example, a field known as neuromorphic computing, uses a computing device (or other electronic circuit) to mimic biological neural systems. Generally, these systems are able to learn by encoding sensor data into a digital form, e.g., sparse distributed representation (SDR). The SDRs are fed into a simulated neural network, where they can enhance or deemphasize certain persistent memory locations. In this way, the neural network can detect patterns present in the encoded data, and use the patterns for, among other things, classification and prediction.

Neuromorphic computing systems have been found useful for applications such as facial and speech recognition. Generally, to reduce the amount of needed computation resources, the amount and type of sensor inputs are limited to those needed for particular application. For example, even though humans may use visual cues (e.g., movements of the speaker's mouth) to aid in speech recognition, it may be too expensive, e.g., in terms of computing resources, to use video input to a voice recognition system. However, a storage compute device may have enough storage and processing capacity to fuse multiple sensor inputs, potentially enhancing performance for tasks that are currently being performed with a single sensor.

Figure 4:
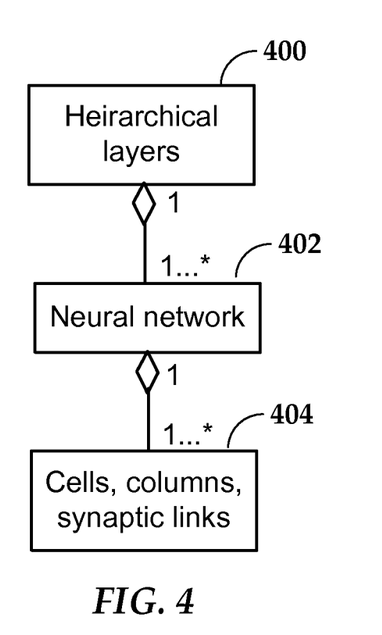

The present tiered data storage may have uses in neuromorphic computing applications. An example is shown in FIG. 4, which is a block diagram of objects and sub-objects usable in a neuromorphic computing application. A neuromorphic device may include hierarchical layer objects 400 that mimic the layers of the cerebral cortex. Each of the layer objects 400 may include a neural network sub-object 402. Each neural network sub-object 402 may itself aggregate sub-objects 404, which may include cells, columns, synaptic links, etc.

Using tiered storage for neuromorphic computing may be used where some parts of the neural network need to be updated, written, and/or read much more quickly than others, e.g., long-term verses short-term memory tasks. As such, the different tiers of memory may be more suited to different parts of the neural network. This may also include identifying regions that are receiving or likely to receive more activity, e.g., hot and cold parts of the neural network.

The determination of a storage tier for data objects and sub-objects as described above can be done as part of pre-processing, e.g., when the matrix data and/or requested operations are received from a host. The determination may be made and/or modified dynamically based on patterns of access. For example, instead of attempting to predict access patterns for every operation, a storage compute device may monitor access patterns affecting data objects, or parts thereof. This monitoring may also include monitoring available capacity of the different tiers. These access patterns and indications of capacity may trigger moving data objects between tiers to improve performance and/or more efficiently use capacity, e.g., to reduce energy usage.

The different data memory/storage tiers may also be adapted/configured to reduced performance gaps between adjacent tiers. An example of a tiered storage arrangement according to another example embodiment is shown in the block diagram of FIG. 5. Tiered non-volatile memory 500 includes different tiers of memory, as represented by different media types 502-505, which may have similar characteristics, e.g., relating to speed and capacity, as described for analogous types in FIG. 2. Each of the media types 502-505 are associated with respective processing resources 512-515. The processing resources 512-515 may include input/output channels or busses, computational processors (e.g., parts of a distributed computational engine), input/output processors, media control/translation layers, etc. In addition, the tiered storage selection 110 may store intermediate computing results in volatile memory DRAM 130, so that the associated DRAM processor 131 can pre-process the intermediate computing results, and pass the results to the SRAM 112. The compute engine 109, the DRAM processor 131, and the processing resource 512-515 may be part of the processor tiers associated with the memory/storage tiers.

Figure 5:
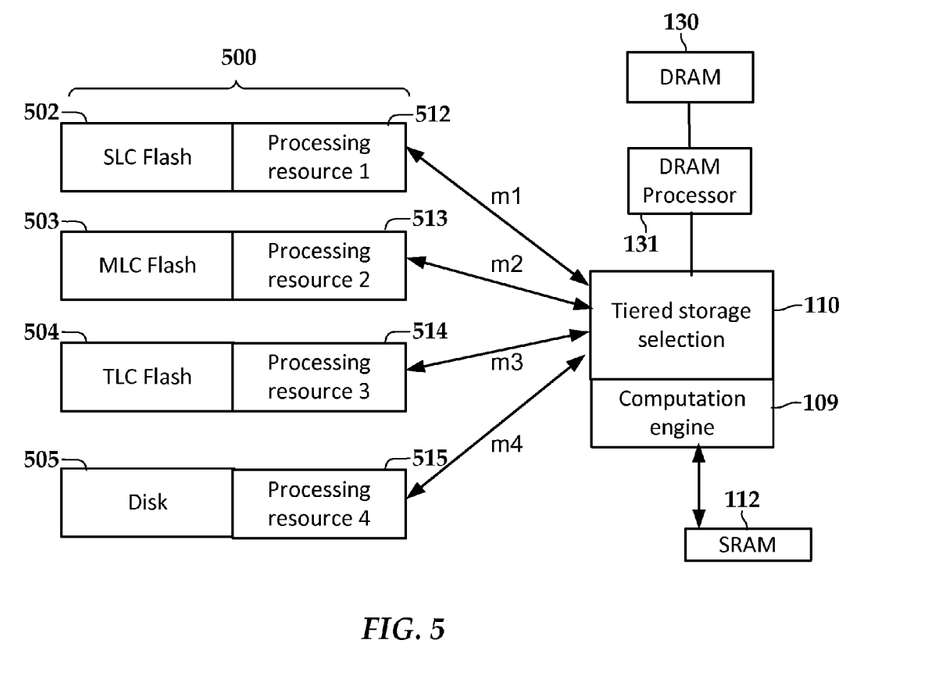
FIG. 5 is a block diagram of a tiered storage arrangement according to another example embodiment.

The compute engine, the DRAM processor, and the processing resources 512-515 may be matched to the respective media types to improve computing efficiency. For example, the compute engine, the DRAM processor, and the processing resources 512-515 may have different performance levels to such that performance gaps (e.g., differences in data throughput, latency, etc.) between adjacent tiers is reduced. As such, the speed of the processing resources can be added to (or subtracted from) the inherent speed of the media of each tier. Such parameters as clock speed, bus width, word size, chipset architecture, speed and size of memory buffers, operating voltages, etc., may be selected for the compute engine 109, the DRAM processor 131, and the processing resources 512-515 to achieve this performance differential. The compute engine 109, the DRAM processor 131, and the processing resources 512-515 may also facilitate reduction of energy consumption. For example, processing resources 512-515 may be selectively depowered, slowed down, throttled, etc., in order to reduce power consumption.

Figure 6:
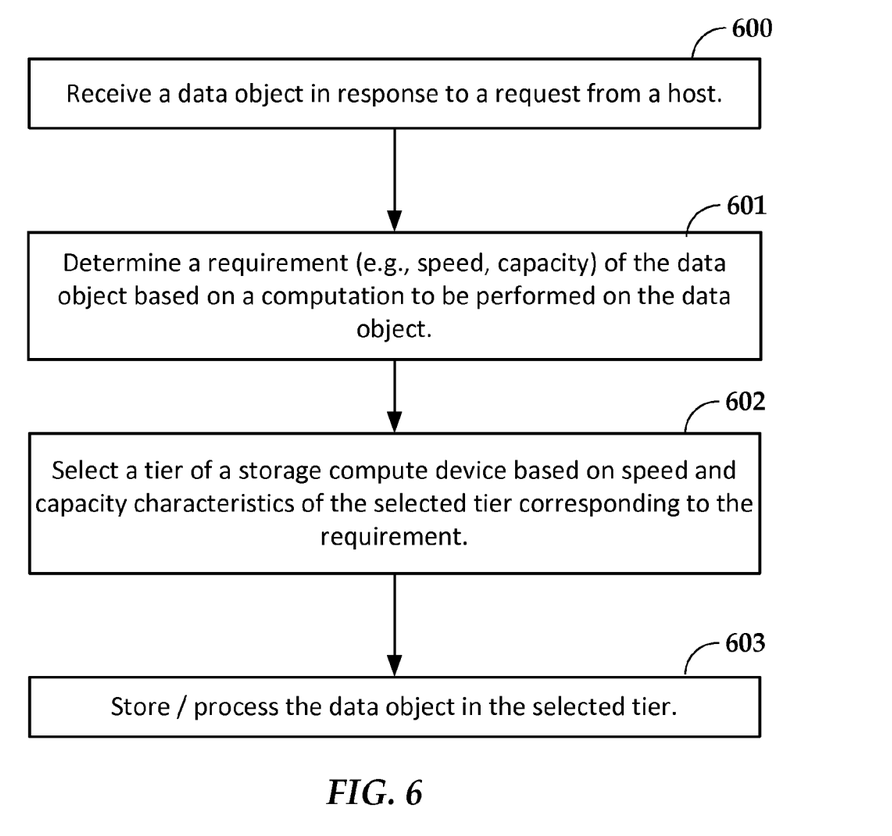
FIG. 6 is a flowchart illustrating a method according to an example embodiment.

In reference now to FIG. 6, a flowchart illustrates a method according to an example embodiment. The method involves receiving 600 a data object at a storage compute device in response to a request from a host. A requirement of the data object is determined 601 based on a computation to be performed on the data object at the storage compute device. The requirement is related to at least speed and capacity of media used to store the data object. A tier is selected 602 from a plurality of tiers of the storage compute device based on speed and capacity characteristics of the selected tier corresponding to the requirement. The data object is stored 603 in the selected tier.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination and are not meant to be limiting, but purely illustrative. It is intended that the scope be limited not with this detailed description, but rather determined by the claims appended hereto.

What is claimed is:

1. A method comprising:
receiving a data object and a command at a storage compute device in response to a request from a host, the command specifying a matrix computation to be performed on the data object at the storage compute device;
determining a requirement of the data object based on the matrix computation, the requirement related to at least speed and capacity of media used to store the data object;
selecting a tier of non-volatile memory from a plurality of tiers of the storage compute device based on speed and capacity characteristics of the selected tier corresponding to the requirement of the data object;
storing the data object in the selected tier; and
performing the matrix computation on the data object stored in the selected tier.

2. The method of claim 1, further comprising separating the data object into two data sub-objects and storing the two data sub-objects in two different tiers based on the computation being performed on the data object.

3. The method of claim 2, wherein the sub-objects comprise a matrix and a transformed version of the matrix or metadata describing the matrix.

4. The method of claim 2, wherein the sub-objects comprise a matrix formatted using different types of compression.

5. The method of claim 1, wherein the requirement further is further related to reliability of the media used to store the data object.

6. The method of claim 1, wherein the matrix computation produces an intermediate result, and wherein the intermediate result is stored in a different tier than the data object.

7. The method of claim 1, wherein tiers of the storage compute device further comprise volatile memory.

8. The method of claim 7, further comprising performing the matrix computation in a second selected tier of the volatile memory using the stored data object.

9. The method of claim 7, further comprising performing the matrix computation within the selected tier using the stored data object, wherein the computation produces an intermediate result, the intermediate result being stored in a second selected tier of the volatile memory.

10. The method of claim 1, wherein the matrix computation involves the data object and a second data object received at the storage compute device in response to the request from the host.

11. The method of claim 1, wherein the requirement is further based on a size of the data object and the ability to retrieve the object using a sequential read operation.

12. A storage compute device, comprising:
a host interface;
a channel interface facilitating access to non-volatile memory, the non-volatile memory comprising a plurality of tiers having different characteristics relating to at least speed and capacity; and
a processor coupled to the host interface and the channel interface, the processor configured to:
receive a data object and a command via the host interface, the command specifying a matrix computation to be performed on the data object at the storage compute device;
determine a requirement of the data object based on the matrix computation, the requirement related to at least speed and capacity of media used to store the data object;
select a tier from the plurality of tiers of based on speed and capacity characteristics of the selected tier corresponding to the requirement of the data object;
store the data object in the selected tier; and
perform the matrix computation on the data object stored in the selected tier.

13. The storage compute device of claim 12, wherein the processor is further configured to separate the data object into two data sub-objects and store the two data sub-objects in two different tiers based on the computation being performed on the data object.

14. The storage compute device of claim 13, wherein the sub-objects comprise a matrix and a transformed version of the matrix.

15. The storage compute device of claim 13, wherein the sub-objects comprise a matrix and metadata describing the matrix.

16. The storage compute device of claim 13, wherein the sub-objects comprise a matrix formatted using different types of compression.

17. The storage compute device of claim 12, wherein the matrix computation produces an intermediate result, and wherein the intermediate result is stored in a different tier than the data object.

18. The storage compute device of claim 12, wherein the plurality of tiers each comprise separate processing resources coupled to respective media in each of the tiers, the processing resources are configured to reduce performance gaps between adjacent tiers or to reduce power consumption of the storage compute device.

19. A storage compute device, comprising:
a host interface;
a non-volatile memory comprising a plurality of tiers, each of the tiers comprising:
media having specific characteristics relating to at least speed and capacity; and
a processing resource coupled to media, the processing resource configured to reduce performance gaps between adjacent ones of the plurality of tiers;
a processor coupled to the host interface and the non-volatile memory, the processor configured to:
receive a data object and a command via the host interface, the command specifying a matrix computation to be performed on the data object at the storage compute device;
select a tier from the plurality of tiers of based on speed and capacity characteristics of the selected tier corresponding to a requirement of the data object;
store the data object in the selected tier; and
perform the matrix computation on the data object stored in the selected tier.

20. The storage compute device of claim 19, wherein the processing resources are configured to reduce the performance gaps between adjacent ones of the plurality of tiers by configuring at least two tiers to have different configurations related to one or more of clock speed, bus speed, word size, and memory buffer size.

* * * * *